Dec. 22, 1931.  D. W. GILL  1,837,541
VELOCIPEDE
Filed Feb. 19, 1930
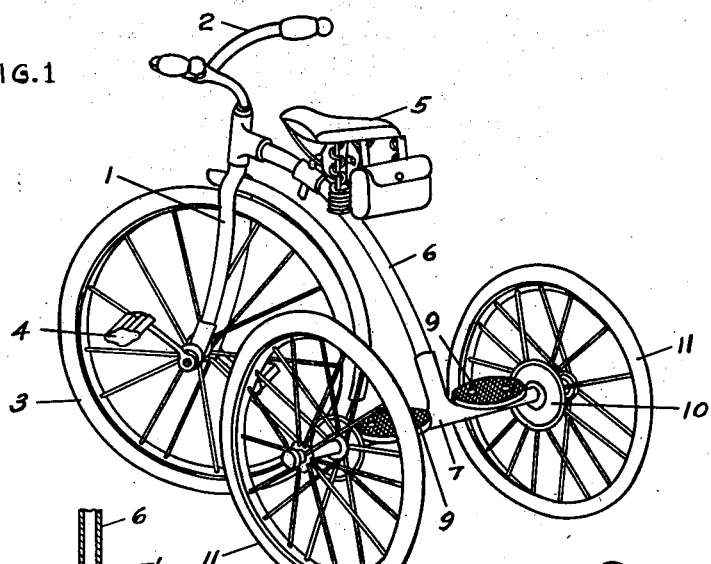
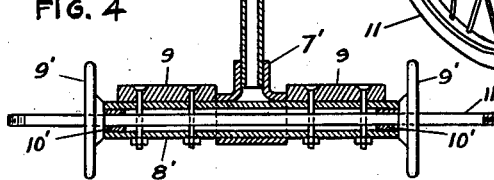
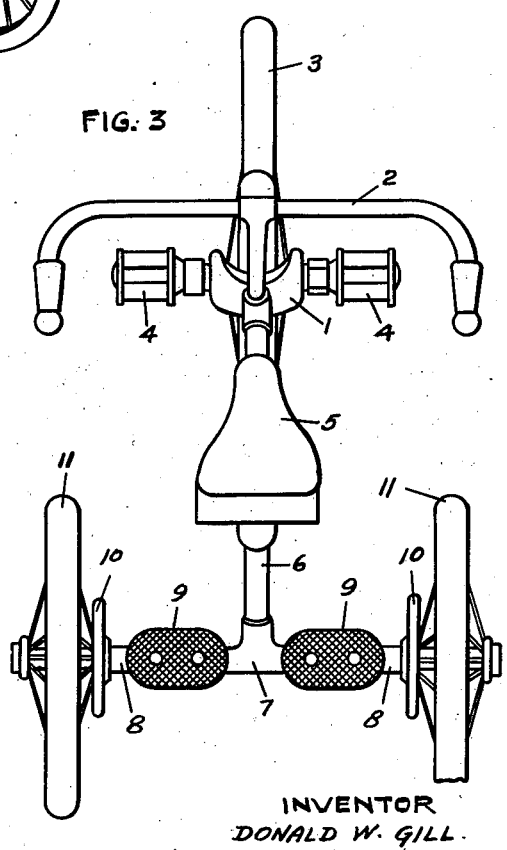
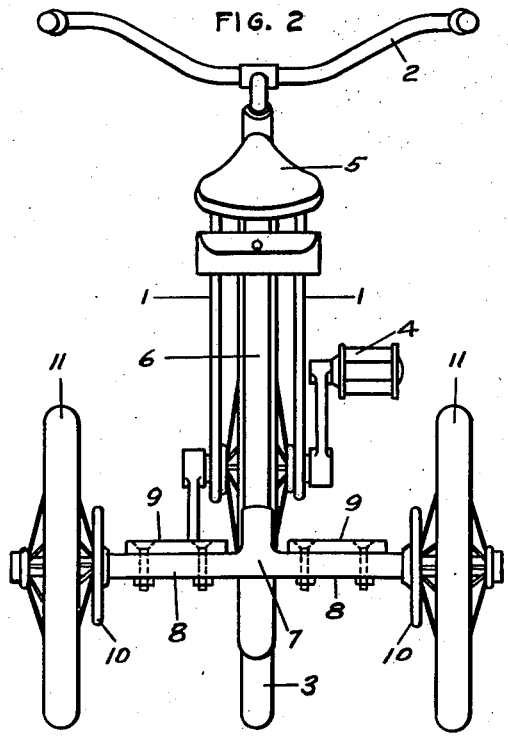
INVENTOR
DONALD W. GILL.
BY
ATTORNEYS Patented Dec. 22, 1931

1,837,541

UNITED STATES PATENT OFFICE

DONALD W. GILL, OF CINCINNATI, OHIO, ASSIGNOR TO THE FRANK F. TAYLOR COMPANY, INCORPORATED, OF NORWOOD, OHIO, A CORPORATION OF OHIO

VELOCIPEDE

Application filed February 19, 1930. Serial No. 429,581.

This invention relates to improvements in velocipedes.

It is an object of this invention to provide a velocipide on which the rear axle is connected to the front part of the velocipede by a single curved bar which is attached to the axle so as to provide room on each side of the bar for step plates.

It is also an object of this invention to provide in connection with the rear axle that has a pair of step plates thereon, wheel guards between the step plates and the wheels so that a child using the velocipede and standing upon the rear axle will not be in danger of getting his feet within the spokes of the wheel.

It is a further object to provide in connection with the velocipede a pair of step plates on the rear so that the child may easily mount the velocipede from the rear and dismount therefrom in the same manner. This is especially advantageous for the child in dismounting from the velocipede going down hill. When he has lost control, all that is necessary for the child to do is to step upon the step plates and off the velocipede to the rear thereof, it being unnecessary to dismount in front of the velocipede.

For the purpose of illustration there is shown in the accompanying drawings a preferred embodiment of this invention.

Figure 1 is a perspective view of the velocipede;

Figure 2 is a rear view;

Figure 3 is a top plan view;

Figure 4 is a view showing a modified form of the rear axle support.

This velocipede is in the general form and shape of a tricycle having a front forked frame 1 on the top of which are handle bars 2. On the lower end of this front frame is a front wheel 3 supported by the usual axle which has on each end a treadle 4 by which the velocipede is operated. Extending from the upper part of the front frame and pivoted thereto is a rearwardly extending bar or tube 6 which supports the saddle 5. The rear and lower end of this bar or tube 6 has extending from each side thereof short arms forming with the bar 6 a T-shaped structure indicated by the numeral 7.

Each arm of this T-shaped structure is indicated by the numeral 8 and has attached thereto a step plate 9. These step plates may be attached to the arms by any suitable means such as screws or bolts—bolts are used in the present instance. On each end of the arm 8 is the wheel 11 and between each wheel and the step plate is a wheel guard 10. A modified form of the rear axle is shown in Figure 4. In this form the rear lower end of the bar or tube 6 is joined to the central projection of an inverted hollow T-casting 7' which has through its horizontal arms and braced thereto a heavy walled tubing 8'. The axle 11' extends through the tubing 8' and has at each end a guard 9'. On the tubing 8' on each side of the bar or tube 6 is a step plate 9 fastened thereto by means of bolts. These bolts in connection with centering plugs 10' hold the axle in position in the T-casting. The purpose of the guards is to protect the feet of the child upon the step plates and prevent the feet from slipping into the spokes of the wheel. This structure is illustrated in Figure 1. As shown in this figure and other figures, the step plates are in such position that the child holding the handle bars may step upon either one of the plates without getting in front of the wheels. After one foot has been placed upon one step plate the other may be placed upon the other step plate and from this position the child may easily and readily place its body upon the saddle 5 after which the feet may engage the treadle for operating the velocipede. In case the child should wish to dismount it is only necessary to place one foot upon one step plate and then the other upon the other step plate after which the child may easily step behind the velocipede upon the ground or other support upon which the velocipede is resting. In mounting the velocipede in this manner there is no obstruction between the step plates and the treadles in which the child can get its foot caught, causing it to trip or fall over.

The entire absence of shoulders or arches on the rear axle makes it easy for the child to mount and dismount from the velocipede without being in danger or without getting its feet caught in the arch or other supports used generally in connection with structures of this kind. In riding on saddles of the usual type of velocipedes which have the rear arch, the child can not readily extend his feet rearwardly toward the step plates on the axle and dismount. The rear arches or shoulders, which are on the average velocipede, about eight or ten inches higher than the axle can not be used for this purpose, because they are generally round and unfitted for foot rests. With the step plates thus provided it is a simple matter to swing the leg rearwardly, and with both feet on the plate dismount in comfort and safety. The feature is particularly valuable when the velocipede gets out of control, such as going down a hill, and will prevent many upsets.

It will be understood that I desire to comprehend within my invention such modifications as may be clearly embraced within the scope of my claims and invention.

Having thus fully described my invention, what I claim as new and desire to secure by Letters Patent, is:

1. In a velocipede, a frame having a front wheel and a pair of rear wheels, a foot support adjacent each rear wheel and a foot guard between each rear wheel and its adjacent foot support.

2. In a velocipede, a frame having a front part supported by a front wheel and a rear T-shaped part pivoted to the front part and supported by a pair of wheels, a foot support on the rear part adjacent each rear wheel and foot guard between each rear wheel and its adjacent foot support.

3. In a velocipede, a front wheel supported frame, a rear axle member having a wheel on each end, a bar extending upwardly and forwardly from the center of said axle member and pivoted at its front end to said frame, a foot support on said axle member between said bar and each wheel, and a foot guard between each foot support and the adjacent wheel.

4. In a velocipede, a frame having a T-shaped part supported by a pair of wheels, a foot plate adjacent each wheel and a foot guard between each wheel and its adjacent foot plate.

5. In a velocipede, a saddle bar having on one end a T-casting, a tube extending through and attached to said casting, a foot rest on said tube on each side of said T-casting, an axle extending through said tube and a common means for attaching the foot rests on the tube and the axle to the tube.

In testimony whereof I affix my signature.

DONALD W. GILL.